Sept. 7, 1926.
B. W. KING
1,599,134
HUMANE ANIMAL SECURING, KILLING, AND CASTING MACHINE
Filed July 21, 1923 2 Sheets-Sheet 2
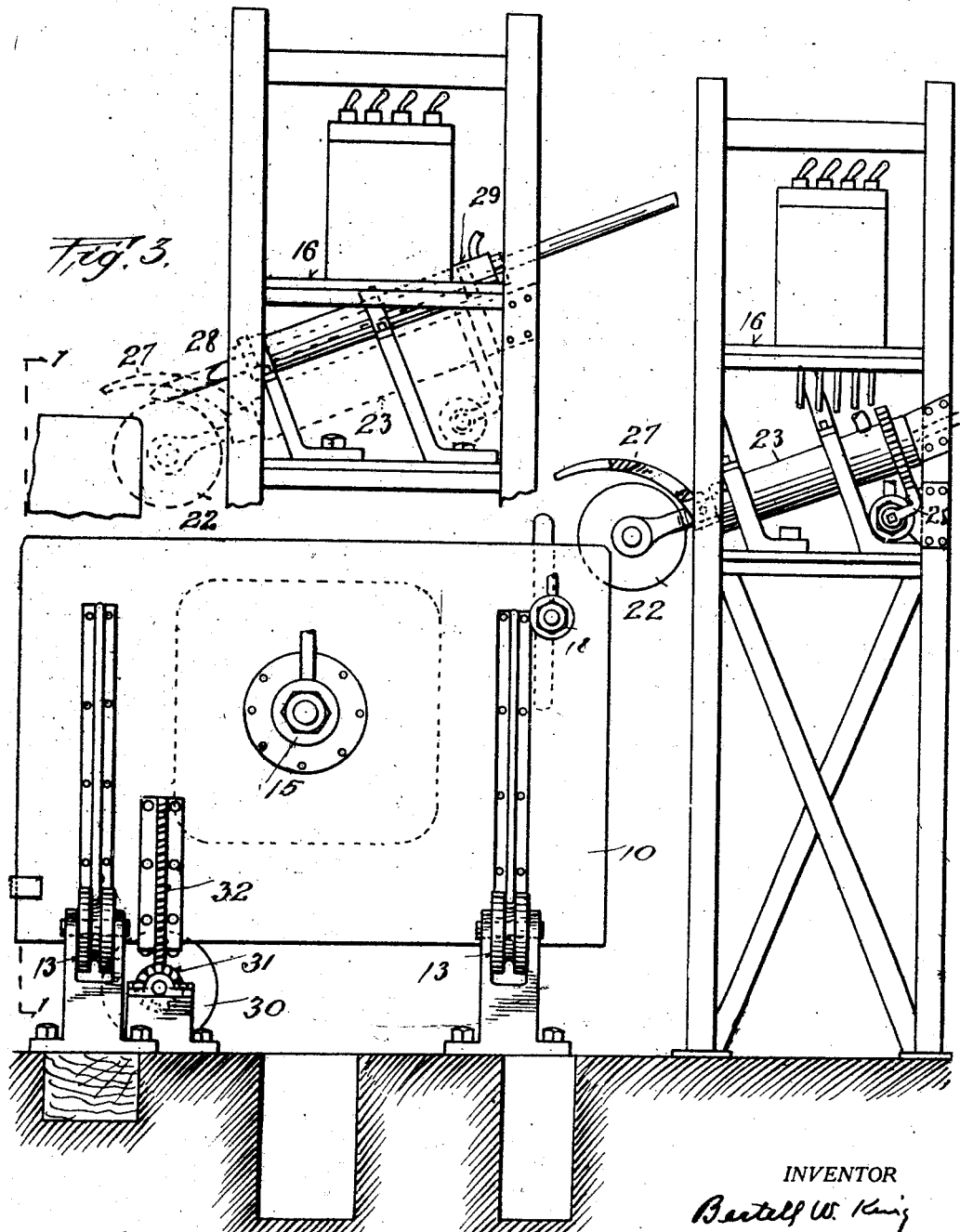
INVENTOR
Bertell W. King
BY Darby & Darby
his ATTORNEYS Patented Sept. 7, 1926.

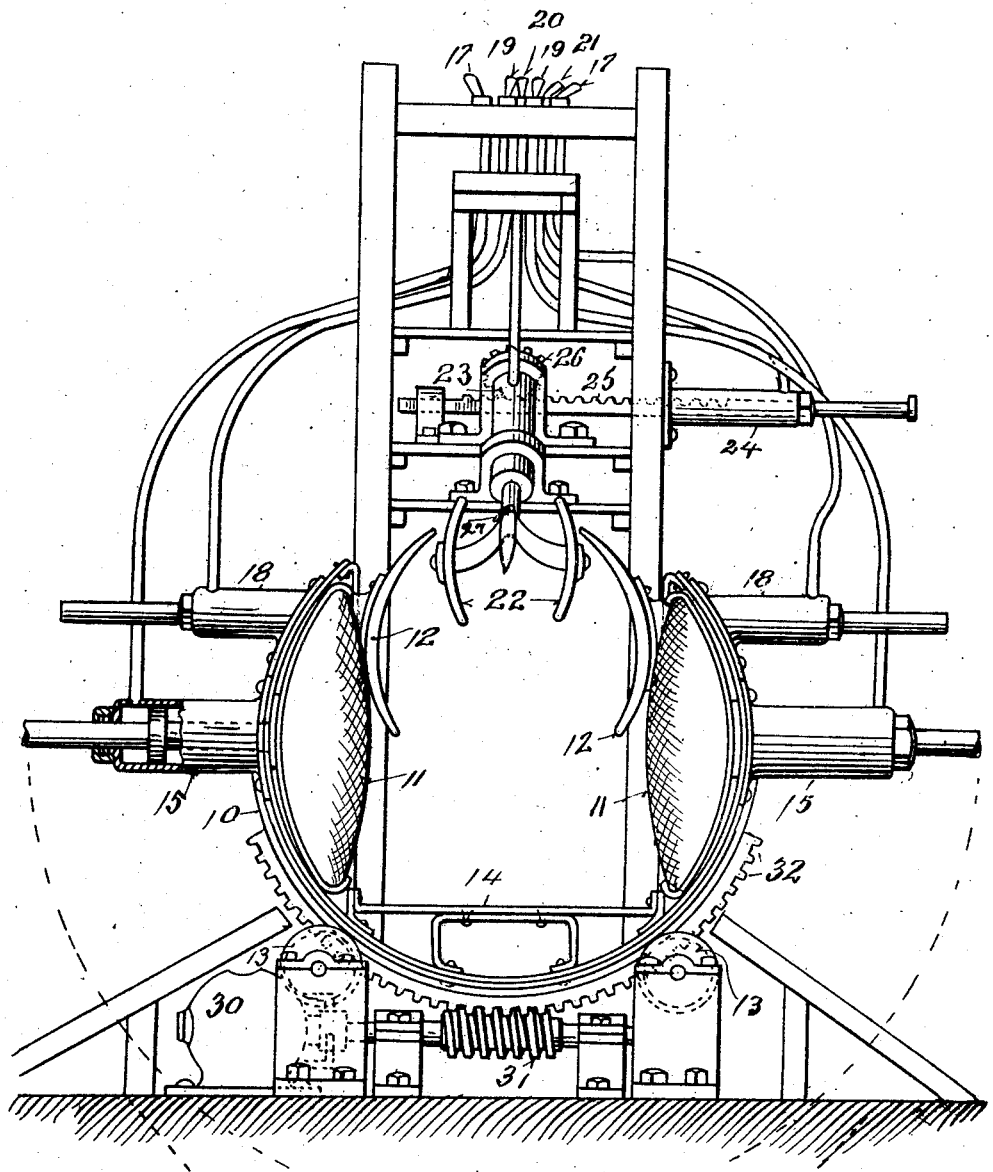

1,599,134

UNITED STATES PATENT OFFICE.

BERTELL W. KING, OF BROOKLYN, NEW YORK.

HUMANE ANIMAL SECURING, KILLING, AND CASTING MACHINE.

Application filed July 21, 1923. Serial No. 652,979.

For leading cattle to the slaughter block, it is a common practice, in slaughter houses, to drive a number of animals into a runway, which is divided into pens by movable gates. Several animals are usually confined in each pen thus provided and immediately adjacent each pen is the killing floor or "bed". As soon as the animals are confined in a pen, an attendant attaches a grapple chain to the hind limb, or limbs, of the animal to be killed and an overhead hoist forcibly throws the animal and drags it with its head down onto the killing floor. Here it is killed by being first stunned with a hammer and then having the jugular vein opened immediately thereafter, or, for certain purposes, one man holds the head by means of a head clamp while a second man cuts the throat of the animal. In either case is there considerable struggling of the animal and it is more or less hurt or bruised by the rough casting and hoisting methods.

It is my purpose to provide a method and means for more humanely and expeditiously slaughtering cattle, or other animals, and to deliver them to be skinned, drawn and quartered without being subjected to prolonged death agonies. To this end I have devised a mechanism and means of operation which will not only accomplish the desired result, but will at the same time dispense with the services of several attendants, as by my mechanism or machine it is possible for one man to secure the animal, kill it instantaneously and then deliver it to the killing floor where it may be hoisted for bleeding, skinning, etc., as heretofore, or the carcass may be conveyed to the proper stations for the several operations preparatory to being moved to the cooling rooms, in the usual routine manner.

To thus humanely secure and quickly dispatch animals, I provide one or more securing and killing machines in the usual runway, along which the animals, one for each machine, are driven. If several machines are provided, an animal for each machine is permitted to move along the runway and each animal is grabbed by the proper machine as it passes into the open drum, in the manner to be more fully stated below.

Each of these machines is operated by an attendant and when the animal has been dispatched it is delivered onto the adjoining bed for the successive operations, or as above indicated.

Illustrative of my mechanism, I have shown in Fig. 1 an end view which is taken on lines 1—1 of Fig. 2.

Fig. 2 is a side elevation of my machine; and

Fig. 3 is a view in elevation showing the relation of the head clamp and the stunning bolt.

Referring now to the drawings, wherein like numerals are employed to designate similar parts, a body drum 10, having on each side suitable receiving pads 11 and near the forward end neck securing shackles 12, is rotatively mounted on trunnions 13 to be operated in the manner stated below. The drum is open at the top and has a floor 14 to permit the animal to walk into position. The moment that the body of the animal is in position the pad operating pistons 15 are operated by an attendant on the operating platform 16, through the proper manipulation of suitable valves 17. The securing pads will thereby be caused to firmly grip the body of the animal. It will be understood that all the operating pistons are under the operator's control and that these are operated in any suitable manner and by appropriate means, as compressed air for example.

The moment that the body of the animal is clamped, its neck is secured and shackled by shackles 12 being brought together through the operation of pistons 18, which are rendered active by means of valves 19, 19. Valve 20 is then quickly operated to grip the head by means of the head clamp 22 operating in piston 23. If now it is intended to break the animal's neck, valve 21 is opened to permit pressure to operate the twister piston 24 to give it a rotary motion by means of the rack bar 25 engaging co-operating teeth 26 on the head piston 23. To more securely hold the head a crown piece 27 is provided.

If it is intended to kill the animal by first stunning it, the device of Fig. 3 is added to the head holding and twisting mechanisms, or the twisting mechanism, may be omitted. The stunning device comprises a bolt 28, which is operated by a piston 29 from a suitable valve (not shown).

The carcass is now discharged from the holding drum 10. This is accomplished by rotating the drum sufficiently in either direction to permit the carcass to slide onto the bed where it is immediately hoisted and properly bled. Any suitable means for rotating the drum may be employed, as a motor 30 driving a worm 31, which engages a rack bar 32 on the drum, whereby the drum is tilted to the desired angle.

From the above description it is apparent that the animal is not bruised or unnecessarily hurt in being secured into position for its execution, and that it is dispatched with certainty and without delay. There is, further, no opportunity for the escape of a fractious or unusually frisky beast. It is further apparent that the size and construction of my humane securing and killing machine may be varied to suit the requirements for the animals to be killed and that it is as suitable for killing sheep and hogs as it is for killing and handling a Texas steer.

Having now described my invention, what I claim as new and useful, of my own invention, and desire to secure by Letters Patent is:

1. In a securing, killing and casting machine, the combination of a runway, a securing and stunning mechanism in said runway, said securing mechanism including a padded drum, a neck grip and a head grip, and operative means under the control of a single operator for manipulating said mechanism.

2. In a securing, killing and casting machine, the combination of a runway, a securing and stunning mechanism in said runway, means under the control of a single operator for manipulating said securing and stunning mechanism to hold the animal in position while being stunned, and means for depositing the stunned animal to its bleeding pen.

3. In a securing, killing and casting machine, the combination of a runway, a securing and stunning mechanism in said runway and forming a part thereof, means for rendering operative said securing mechanism whereby said runway is closed, means for rendering operative said stunning mechanism whereby the animal is killed, and means for turning the stunned animal on its side to discharge it to its bleeding bed.

4. In a humane animal handling mechanism, a runway, a platform overlooking said runway, means in said runway for securing the animal, means for killing the animal, means for casting the animal, and means controlled from said platform for operating said securing, killing and casting means.

5. A mechanical animal handling device operable by one man, a runway, a platform over said runway, a drum in said runway to form a part thereof and operable from said platform for securing an animal to be slaughtered, means for holding the means for breaking the neck of an animal, means operable from said platform for casting said animal, and means also operable from said platform, for releasing the same.

6. In a one-man animal handling device, an elevated platform, a device operable from said platform for bodily grabbing and holding an animal to be slaughtered, a device also operable from said platform for stunning said animal, and means to deliver said animal dead or in a stunned condition to the beds for bleeding.

In testimony whereof I have hereunto set my hand on this 18th day of July A. D., 1923.

BERTELL W. KING.